United States Patent [19]

Greider

[11] 4,255,879
[45] Mar. 17, 1981

[54] SNOW BLOWER DEAD MAN CONTROL

[75] Inventor: Charles A. Greider, Des Moines, Iowa

[73] Assignee: AMF Incorporated, White Plains, N.Y.

[21] Appl. No.: 21,390

[22] Filed: Mar. 19, 1979

[51] Int. Cl.³ .............................................. E01H 5/09
[52] U.S. Cl. ................................. 37/43 R; 37/43 E; 172/42; 180/272; 192/11; 474/86; 474/133
[58] Field of Search ....................... 37/43, 43 R, 43 E; 172/103, 42, 43; 180/19 R, 272; 192/11; 74/242.8, 242.1 R, 722

[56] References Cited

U.S. PATENT DOCUMENTS

| 2,547,695 | 4/1951 | Eaglesfield et al. | 180/19 R |
| 2,768,453 | 10/1956 | Adams, Jr. | 37/43 E |
| 2,953,863 | 9/1960 | Merry | 37/43 A |
| 3,367,459 | 2/1968 | Rubin | 192/11 |
| 3,580,351 | 5/1971 | Mollen | 37/43 E |
| 3,673,715 | 7/1972 | Lines | 37/43 E |
| 4,062,135 | 12/1977 | Dobberpuhl | 37/43 R |
| 4,123,857 | 11/1978 | Enters et al. | 37/43 E |

FOREIGN PATENT DOCUMENTS 274447  4/1951  Switzerland .............................. 172/42

Primary Examiner—Steven A. Bratlie
Attorney, Agent, or Firm—George W. Price; Walter Lewis

[57] ABSTRACT

A mechanical dead-man type control for the snow blower auger and wheels but without killing the engine.

1 Claim, 4 Drawing Figures

SNOW BLOWER DEAD MAN CONTROL

This invention relates to snow blowers, and more particularly, to an improvement in the controls therefor.

It is an object of this invention to improve the controls of snow blowers from the standpoint of increased safety and convenience of operation and low cost.

Briefly, it is known in the art to provide a "dead-man" feature in snow blowers so that should the operator leave his position behind the unit without first putting it in a "no-drive" condition, the unit will automatically shut itself off. Typically, this is done by an electrical system that kills the engine. The disadvantage of this is that the unit must then be started up again, and not infrequently the system is prone to malfunction because of a problem in the electric system such as a defective switch.

In my invention the dead-man feature is a low cost mechanical arrangement so that if the unit is left unattended without placing it in neutral the drive to the wheels and auger and impeller or blower will be automatically shut off but without killing the engine.

The invention will be best understood by considering the following description thereof taken in connection with the accompanying two sheets of drawings in which FIG. 1 is a broken away perspective view of a snow blower incorporating the invention;

Figure 2:
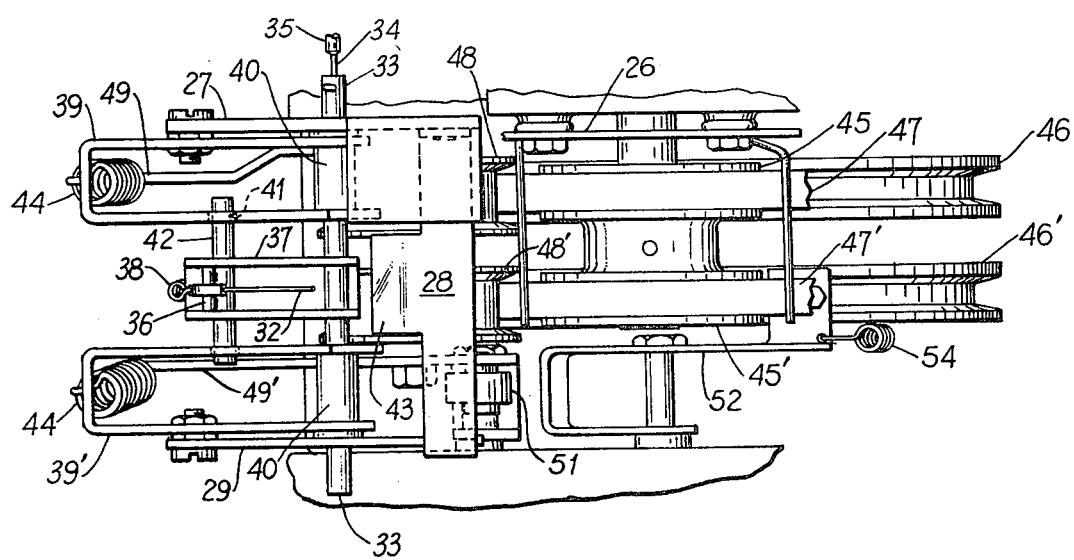
FIG. 2 is an enlarged broken away top plan view of the mechanism shown in the broken away area of FIG. 1.
Figure 3:
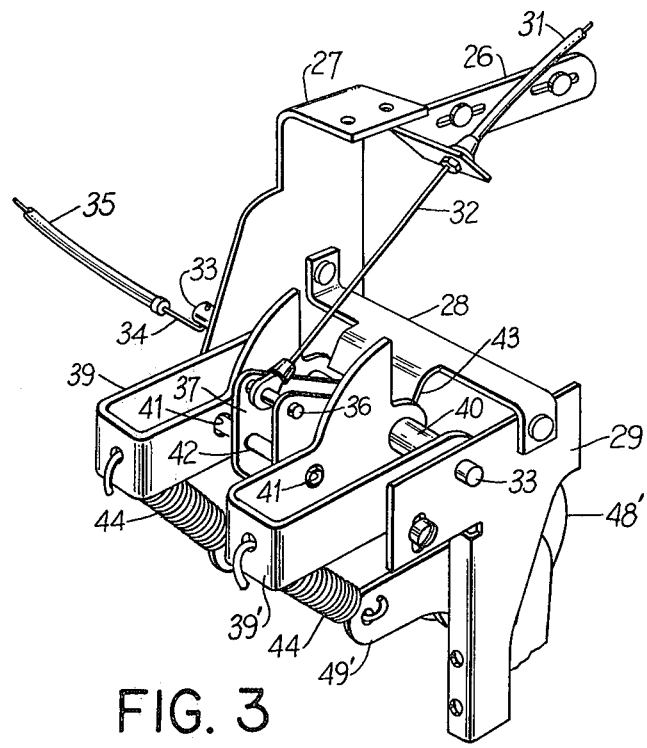
FIG. 3 is a broken away perspective view of that same mechanism.
Figure 4:
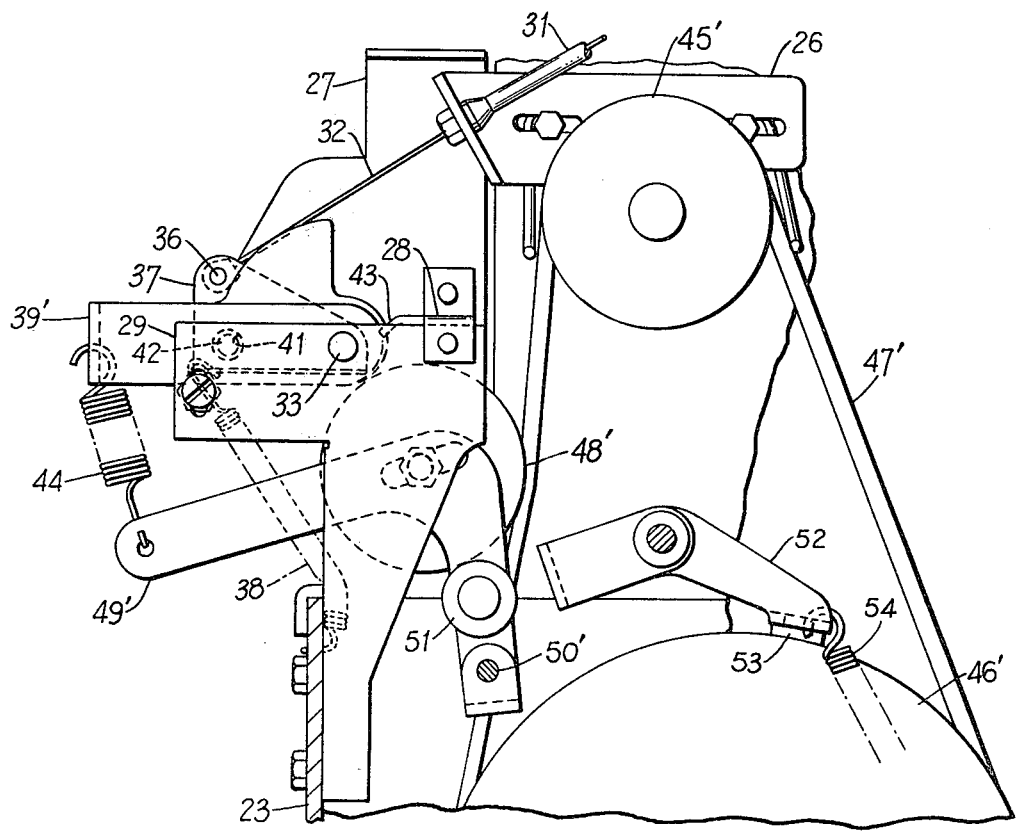
FIG. 4 is an end view.

Briefly, the instant invention resides primarily in that part of the snow blower shown in FIGS. 2-4 and the remaining part thereof is mostly conventional. So, the whole snow blower will not be described in detail but only generally. The snow blower has an engine indicated generally by reference numeral 10. The engine provides power for driving a pair of wheels 11 either in forward or reverse, an auger 12, and a not shown blower or impeller in a housing portion 13. The snow is discharged out through a chute 14.

Extending rearwardly of the unit is a handle assembly comprising a pair of tubes 15 and a control panel 16. Mounted on or adjacent to panel 16 are several controls. Control 17 is for adjusting the position of a deflector 18 on chute 14 through a cable controlled mechanism 19 interconnecting the chute and deflector, and is more particularly described and claimed in my copending patent application Ser. No. 955,662 filed Oct. 27, 1978 now U.S. Pat. No. 4,205,468, and assigned to the same assignee as the instant invention.

Control 20 is a conventional engine throttle control to adjust the speed thereof and includes a start and fast position at one end thereof and a slow and stop position at the other end thereof. Control 21 is a wheel drive selector which includes a single reverse speed, a neutral or no wheel drive position, and four different forward speed wheel drive positions. The stem of the handle 21 can be moved to different portions of a slot 22 in panel 16. When it is in the horizontal slot portion, a not shown clutch mechanism in the housing portion 23 beneath the engine 10 is in disengaged position so that the wheels 11 are not driven although the engine is running. In the rear slot portion the clutch is engaged and the wheels 11 are driven in reverse. In any of the four forward slot portions the clutch is engaged and the not shown wheel drive in housing portion 23 is effective to drive the wheels forward. This wheel drive and neutral clutch arrangement which has been alluded to as being in the housing portion 23 is conventional. An example thereof is shown in prior U.S. Pat. No. 3,678,770 (1972), and the instant snow blower uses that type.

Figure 1:
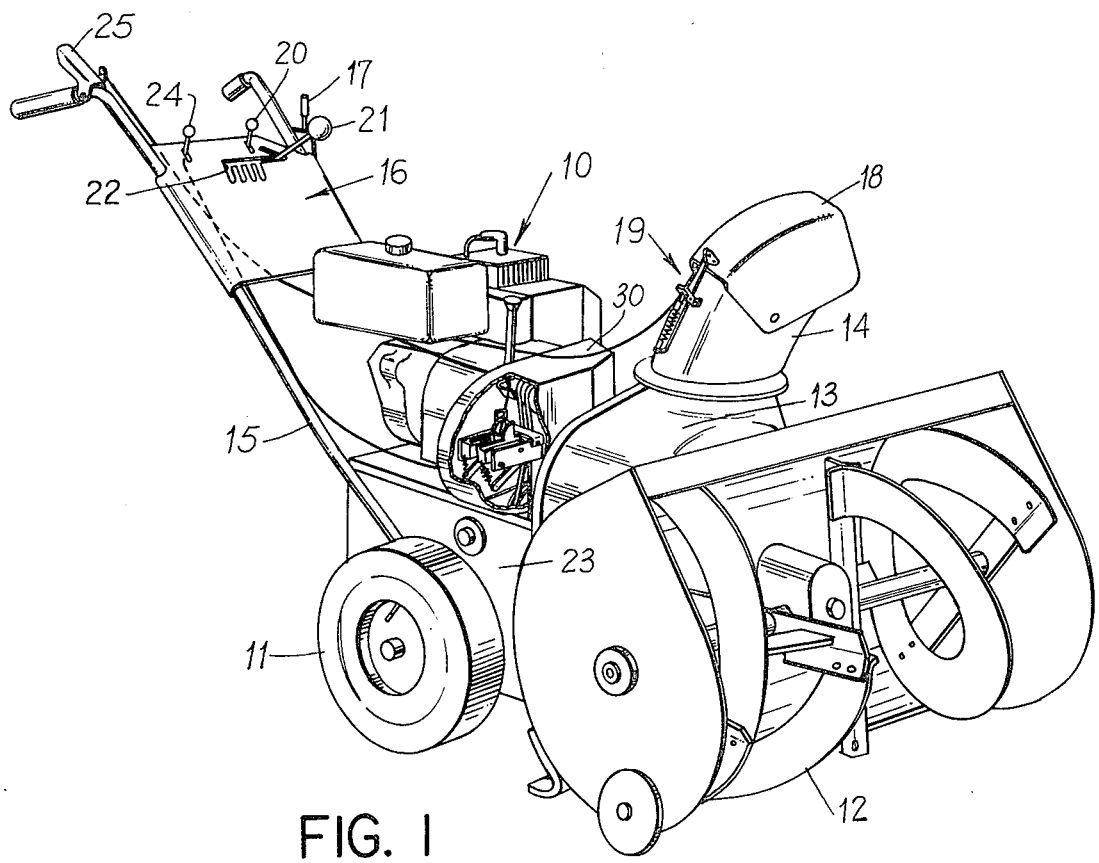

The control 24 is a selector for the mechanism shown in the broken away portion of FIG. 1 and in FIGS. 2—4, and the control 25 is a dead-man type clutch control of the same mechanism. Briefly, control 24 selects whether the wheels 11 and the auger 12 and blower or impeller together will be driven simultaneously or either one independently of the other. If control 24 is in the forward position when control 25 is depressed, just the wheels 11 will be driven provided of course that the engine is running and control 21 is in any position other than neutral. If the control 24 is in the rear position when control 25 is squeezed, the wheels 11 and auger 12 are driven simultaneously provided the engine is running and the control 21 is in any position other than neutral. If control 21 is in neutral, then only the auger 12 is driven. In any event, regardless of the position of control 21, when the instant control 25 is released, the wheels 11 and auger 12 will cease to be driven, but without killing the engine 10. Thus, control 25 is a dead-man or overriding type clutch control so that nothing will run, aside from the engine, should the operator release the control 25, as if he should have a fall or momentarily leave his position behind the snow blower. The wheels 11 and auger 12 can be driven only as long as the control 25 is squeezed. Thus, the engine can continue to run, but as a matter of safety, there is no way the snow blower or auger (or blower or impeller) will move if the operator comes around to the front of the unit. All this will become more readily apparent after considering the following detailed description of the mechanism shown in FIGS. 2-4.

Referring now particularly to FIGS. 2-4, the parts 26-29 inclusive (see especially FIG. 3) are brackets to mount the mechanical wheel and auger selector and clutch control mechanism on the unit inside a removable cover or housing portion 30 therefor (see FIG. 1). The bracket 26 serves as a means for dead-ending the sheath 31 of an operating cable 32 that originates at the control 25. The bracket 28 spans the brackets 27 and 29 and operates as a stop or spacer for parts still to be described. The parts 27 and 29 are main mounting brackets affixed to the snow blower between the engine 10 and blower housing 13, and they mount the moving parts still to be described.

A shaft 33 extends through the end brackets 27, 29. Besides being capable of rotating with respect to the brackets 27, 29, the shaft 33 can be moved lengthwise with respect to the brackets 27, 29. The shaft 33 is pulled rearwardly (towards the snow blower handle 15) by a cable 34 connected to the left end thereof. Cable 34 is in a sheath 35 affixed to a suitable portion of the unit and it originates at the selector control 24. When control 24 is moved forwardly to no auger drive selected position, it causes the cable 34 to pull shaft 33 to the left or rear. If the control 24 is moved in the opposite direction to auger drive selected position, then cable 34 moves shaft 33 in the opposite direction. The reason for this lengthwise movement will become clear hereinafter.

The shaft 33 is rotated upwardly (or clockwise when viewing FIG. 3) by the cable 32 when the dead-man lever 25 is squeezed. This is because cable 32 is dead-ended at a pin 36 to a generally U-shaped member 37 which is affixed to about the central portion of shaft 33. When lever 25 is released, the shaft 33 rotates in the opposite direction by virtue of a return spring 38 connected at its opposite ends to the U-member 37 and an adjacent portion of housing 23.

Mounted on the shaft 33 along opposite sides of the U-member 37 are a pair of generally U-shaped end members 39, 39' which are somewhat larger than the intermediate U-member 37. The shaft 33 extends through the inner ends of both legs of each U-member 39, 39' so that shaft 33 is free to rotate and move lengthwise with respect to the U-members 39, 39'. The spacing between each pair of legs of each U-member 39, 39' is maintained by a tubular spacer 40 therebetween, the shaft 33 also passing through the spacers 40.

At their facing legs the U-members 39, 39' have a pair of aligned apertures 41. A pin 42, affixed to the intermediate U-member 37 below the pin 36, is sized lengthwise so that it will either extend solely into the hole 41 in large U-member 39 but not hole 41 in U-member 39', or also into hole 41 in U-member 39', depending upon the lengthwise position of shaft 33 as determined by the selected position of control 24. When the cable 34 is moved in a direction away from shaft 33, the shaft 33 and small U-member 37 move in the same direction so that pin 42 withdraws from hole 41 in member 39' and is only in the hole 41 in member 39. This is the wheel drive only selected position of the control 24 so that if the control 25 is squeezed only the wheels will be driven. However, if cable 34 is pushed towards shaft 33, then shaft 33 and part 37 are moved in the same direction so that pin 42 will still be in hole 41 of part 39 but now also in the hole 41 of part 39'. This is the wheel and auger drive together position of control 24 and if control 25 is now squeezed, both the wheels and auger will be driven. Of course, if control 21 is in neutral, then only the auger will be driven. When the shaft 33 is shifted in either direction, the parts 39, 39' hold their illustrated position because they butt up against the brackets 27 and 29 on their outer sides, and at their inner sides they butt up against a stop or spacer tab 43 formed on the bridging piece 28 that extends between brackets 27, 29. When the cable 32 is pulled up, it pulls the small U-member 37 up, and in addition will also cause the large U-member 39 and 39' to move up, depending upon whether the pin is just in hole 41, just in member 39 or also member 39'. A pair of springs 44 connected to the bites of members 39, 39' assist the spring 38 to move the parts back down.

Extending out from in front of engine 10 are a pair of engine driven pulleys 45, 45'. Positioned below the pulleys 45, 45' are a pair of larger belt driven pulleys 46, 46'. Belts 47, 47' extend between the pulleys 45, 45' and 46, 46'. The pulley 46 is mounted on a not shown shaft which extends into the housing 23 to the previously mentioned neutral, forward and reverse clutch drive mechanism therein for wheels 11 and which is controlled by control 21. The pulley 46' is mounted on a not shown shaft which extends into housing 13 and to the auger 12 to drive the latter and the blower or impeller that discharges the snow up through chute 14.

The belts 47, 47' are loose on the pulleys, but are engaged by a pair of idler pulleys 48, 48' to tighten the belts. When that happens, the wheels 11 can be driven off the pulley-belt system 45–47 assuming control 21 is in other than netural, and the auger can be driven off the pulley-belt system 45'–47'. If at this time control 21 is in neutral, then only the auger will be driven. However, if control 21 is in either forward or reverse, the wheels 11 will also be driven.

The return springs 44 at their lower ends are connected to a pair of bell cranks 49, 49'. The idlers 48, 48' are mounted at the corners of the bell cranks 49, 49' and the bell cranks are pivotally mounted adjacent their lower ends on a pivot axis or pin. The pivot axis for the bell crank 49' is pin 50' (see FIG. 4) and the not visible but comparable one for the bell crank 49 would be behind pin 50' on the other side of the mechanism.

So, the mechanism shown in FIGS. 2–4 when taken in combination with control lever 24 is a mechanical drive selector for just the wheels 11 alone, or together with the auger 12 (or the auger alone if control 21 is left in neutral); and when taken in combination with lever 25 is also a mechanical clutch or drive control safety mechanism in a "dead-man" sense so that neither the wheels nor auger move if the engine is running regardless of the position of the control 21 unless the lever 25 is held depressed. If it is released, then the springs 38, 44 automatically move the idlers 48, 48' away from the belts 47, 47' so that neither of the pulleys 46, 46' is driven. In other words, there is automatic return of the drive to neutral position.

A sequence of operations will be described. In stored condition of the unit, the control 21 will have been moved to neutral, the control 24 moved to disengage the pin 42 from the member 39', and the control 25 released. After the engine is started, if one wants to drive just the wheels 11, he moves the control 21 from neutral to forward and moves the control 25 down and holds it down. When the control 25 is down, the cable 32 moves member 37 up and since its pin 42 is engaged with member 39, it also raises to rock the bell crank 49 so that its idler 48 presses against the belt 47 so that pulley 46 is driven by pulley 45. At this time since the pin 42 is not engaged with member 39', the bell crank 49' will not be moved to cause the idler 48' to move against the belt 47'. So, only the wheels 11 are driven and not the auger 12. If it is desired to also turn the auger, then the control 25 is released. This causes the parts 37, 42, 39 to move to original position whereby the pin 42 is opposite the hole 41 in member 39'. The control 24 is then operated to move the shaft 33 to cause the member 37 to move so that the pin 42 also becomes engaged with part 39'. If the control 25 is now squeezed, both of the idlers are engaged with their respective belts to cause both the wheels 11 and auger 12 to be driven. If one wanted to run just the auger 12, this could be accomplished by moving the control 21 to neutral. To disengage the auger one would release control 25 and then operate control 24 to withdraw pin 42 from part 39'. To move the unit backwards, the control 21 would be moved to and held in reverse and the control 25 squeezed.

An additional safety feature of my invention is brake means for stopping the auger almost instantly. This brake means comprises a roller 51 on the bell crank 49' just above the pin 50'. Viewing Fig. 4, with the pin 42 engaged with part 39' when the cable 32 is pulled, the pin 42 interlocked parts 37, 39' rotate clockwise about shaft 33 and the bell crank 49' clockwise about pivot 50' since part 39' pulls the part 49' through the spring 44. As the part 49' rocks clockwise about pin 50', the roller 51 comes into engagement with the left hand end of another bell crank 52 so as to lift a brake shoe 53 at its right hand end of the pulley 46′. However, when the cable 32 is released to disengage the drive to the auger, the bell crank 49′ rocks counter-clockwise and as the roller 51 leaves the left hand end of bell crank 52, a spring 54 quickly moves its right hand brake shoe end back into engagement with the pulley 46′ to brake it almost the instant the cable 32 is released and to then hold it braked so that the auger cannot turn.

I claim:

1. In a snow blower unit having a front auger, rear wheels, an engine for driving said auger and wheels, and a rearwardly extending handle on said unit, a pair of pulleys on said unit, one of said pulleys having a drive and no drive connection with said rear wheels which includes a first manually operable control on said handle having a forward, reverse, and neutral drive position, the other of said pulleys having a drive connection with said auger, a pair of clutches and a clutch selector mechanism therefor adjacent said pulleys for engaging and disengaging said pulleys with said engine, a second manually operable control on said handle for operating said clutch selector mechanism, a third manually operable control on said handle for operating said clutches in accordance with the setting of said selector mechanism as determined by the selected position of said second control, and means automatically disengaging said clutches upon hand release of said third control, said pair of clutches and clutch selector mechanism therefor comprising another pair of pulleys on said engine, a pair of pulley belts extending between said engine pulleys and unit pulleys, a pair of idler pulleys, a pair of operators for engaging said idler pulleys with said belts, said pair of operators being mounted on a shaft, another operator mounted on said shaft between said pair of operators, said shaft and another operator being immovably fixed with respect to each other, said shaft being rotatable and lengthwise movable with respect to said pair of operators whereby said shaft can be lengthwise moved to move said another operator between said pair of operators, means on said another operator for interlock with at least one or both of said pair of operators depending on the lengthwise position of said shaft, said second control being connected to said shaft to lengthwise move the same, and said third control being connected to said another operator to move those of the pair of operators interlocked therewith.

* * * * *